(12) United States Patent
McCloud et al.

(10) Patent No.: US 11,400,987 B2
(45) Date of Patent: Aug. 2, 2022

(54) SLIDE RAIL ASSEMBLY AND LANDING GEAR ASSEMBLY WITH EMBEDDED HARDPOINT CONNECTORS

(71) Applicant: Wabash National, L.P., Lafayette, IN (US)

(72) Inventors: Travis Smith McCloud, Malabar, KY (US); Ronnal P. Reichard, Melbourne, FL (US); Andrzej Wylezinski, Lafayette, IN (US); Scott A. Storz, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 89 days.

(21) Appl. No.: 16/540,646

(22) Filed: Aug. 14, 2019

(65) Prior Publication Data
US 2020/0055549 A1    Feb. 20, 2020

Related U.S. Application Data

(60) Provisional application No. 62/764,693, filed on Aug. 15, 2018.

(51) Int. Cl.
| | |
|---|---|
| *B62D 25/20* | (2006.01) |
| *B62D 29/04* | (2006.01) |
| *B62D 33/04* | (2006.01) |
| *B62D 21/09* | (2006.01) |
| *B62D 21/20* | (2006.01) |
| *B62D 21/02* | (2006.01) |

(52) U.S. Cl.
CPC ......... *B62D 25/2054* (2013.01); *B62D 21/02* (2013.01); *B62D 21/09* (2013.01); *B62D 21/20* (2013.01); *B62D 29/043* (2013.01); *B62D 33/04* (2013.01)

(58) Field of Classification Search
CPC .......................... B62D 25/2054; B62D 29/048; B62D 29/002; B62D 53/06; B62D 29/043; B62D 21/02; B62D 21/09; B62D 21/20; B62D 33/04
See application file for complete search history.

(56) References Cited

U.S. PATENT DOCUMENTS

| | | |
|---|---|---|
| 5,429,066 A | 7/1995 | Lewit et al. |
| 5,664,518 A | 9/1997 | Lewit et al. |
| 5,800,749 A | 9/1998 | Lewit et al. |
| 5,830,308 A | 11/1998 | Reichard |
| 5,897,818 A | 4/1999 | Lewit et al. |

(Continued)

FOREIGN PATENT DOCUMENTS

| | | | | |
|---|---|---|---|---|
| DE | 102014113822 | * | 3/2016 | ......... B62D 25/2054 |
| JP | 2010269676 A | * | 12/2010 | ............ B62D 53/06 |
| WO | 2016/137974 A1 | | 9/2016 | |

*Primary Examiner* — Gregory A Blankenship
(74) *Attorney, Agent, or Firm* — Faegre Drinker Biddle & Reath LLP

(57) ABSTRACT

A cargo vehicle is disclosed having a composite floor assembly with at least one embedded hardpoint connector. The composite floor assembly may comprise a plurality of transverse beams, wherein a subset of the plurality of transverse beams includes at least one embedded hardpoint connector. The embedded connector may be used to securely and removably couple other vehicle components to the composite floor assembly, such as a landing gear assembly and/or a slide rail assembly.

23 Claims, 13 Drawing Sheets

(56) References Cited

U.S. PATENT DOCUMENTS

| | | | |
|---|---|---|---|
| 5,908,591 A | 6/1999 | Lewit et al. | |
| 6,004,492 A | 12/1999 | Lewit et al. | |
| 6,013,213 A | 1/2000 | Lewit et al. | |
| 6,206,669 B1 | 3/2001 | Lewit et al. | |
| 6,496,190 B1 | 12/2002 | Driemeyer et al. | |
| 6,543,469 B2 | 4/2003 | Lewit et al. | |
| 6,723,273 B2 | 4/2004 | Johnson et al. | |
| 6,755,998 B1 * | 6/2004 | Reichard | B32B 17/067 264/46.5 |
| 6,869,561 B2 | 3/2005 | Johnson et al. | |
| 6,911,252 B2 * | 6/2005 | Lewit | B29C 44/1209 114/357 |
| 8,186,747 B2 * | 5/2012 | Bloodworth | B62D 33/04 296/181.1 |
| 8,474,871 B1 | 7/2013 | Ludwick | |
| 9,371,468 B2 | 6/2016 | Lewit | |
| 9,744,753 B2 * | 8/2017 | Sheffield | B29D 99/001 |
| 9,828,164 B2 * | 11/2017 | Denson | B65D 88/745 |
| 10,239,265 B2 * | 3/2019 | Lewit | B05C 9/14 |
| 2009/0193747 A1 * | 8/2009 | Chorney | B62D 25/2054 52/583.1 |
| 2016/0263873 A1 | 9/2016 | Lewit | |
| 2017/0240217 A1 * | 8/2017 | Storz | B62D 33/048 |
| 2018/0057059 A1 * | 3/2018 | Bauer | B62D 27/065 |
| 2019/0061832 A1 | 2/2019 | McCloud et al. | |
| 2020/0055549 A1 * | 2/2020 | McCloud | B62D 25/2054 |
| 2020/0070894 A1 * | 3/2020 | McCloud | B62D 33/04 |
| 2020/0122783 A1 * | 4/2020 | Storz | B62D 25/2054 |
| 2021/0188365 A1 * | 6/2021 | McCloud | B62D 27/065 |
| 2021/0206432 A1 * | 7/2021 | Willison | B60K 1/02 |

\* cited by examiner

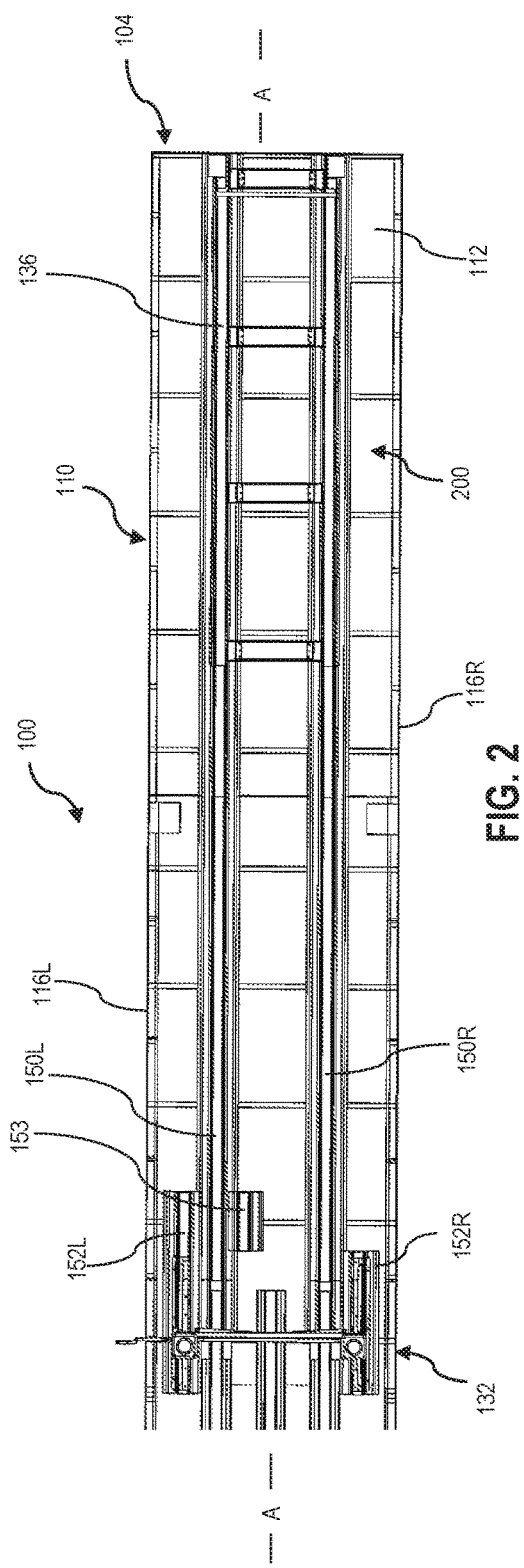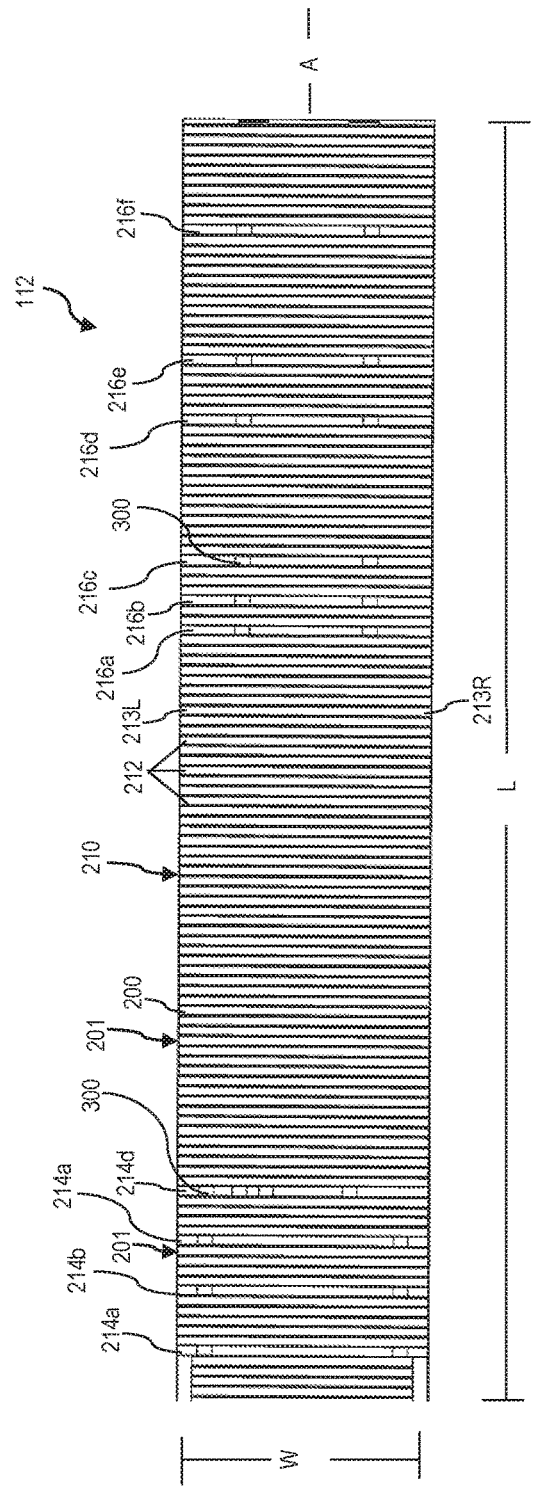

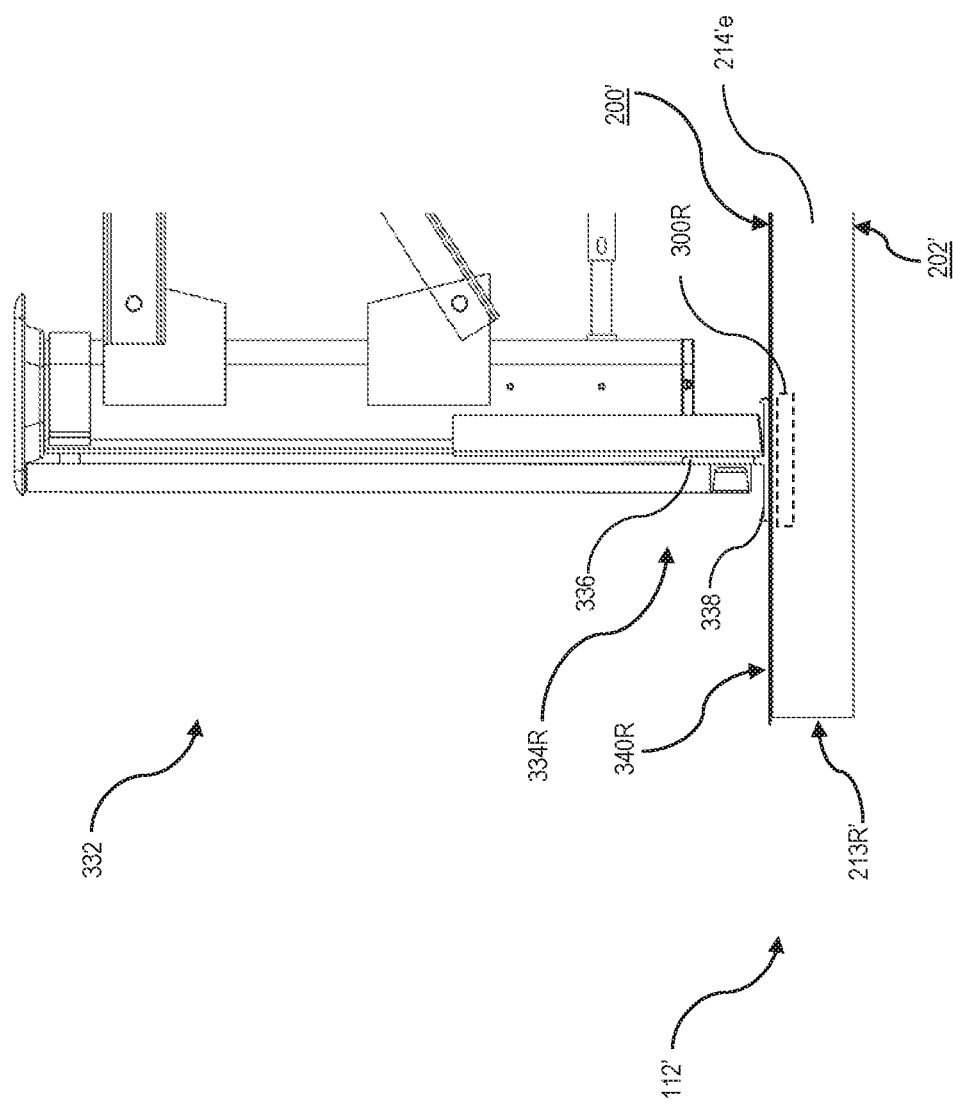

SLIDE RAIL ASSEMBLY AND LANDING GEAR ASSEMBLY WITH EMBEDDED HARDPOINT CONNECTORS

CROSS-REFERENCE TO RELATED APPLICATION

This application claims the benefit of U.S. Provisional Application No. 62/764,693, filed Aug. 15, 2018, the entire disclosure of which is hereby expressly incorporated herein by reference.

FIELD OF THE DISCLOSURE

The present disclosure relates generally to floor structures and methods of making the same. More particularly, the present disclosure relates to composite floor structures with embedded hardpoint connectors for use in cargo vehicles and methods of making the same.

BACKGROUND OF THE DISCLOSURE

Cargo vehicles are used in the transportation industry for transporting many different types of cargo. Cargo vehicles may be constructed using composite materials, which may lead to an absence of or reduction in metallic and wood materials and associated advantages, including simplified construction, thermal efficiency, reduced water intrusion and corrosion, and improved fuel efficiency through weight reduction, for example. However, it is desired to strengthen connections between the composite materials and other vehicle components. For example, it is desired to strengthen a connection between a composite floor assembly and a landing gear assembly, a fuel tank assembly, and/or a slide rail assembly of the cargo vehicle.

SUMMARY OF THE DISCLOSURE

A cargo vehicle is disclosed having a composite floor assembly with at least one embedded hardpoint connector. The embedded connector may be used to securely and removably couple other vehicle components to the composite floor assembly, such as a landing gear assembly, a fuel tank assembly, and/or a slide rail assembly.

According to an exemplary embodiment of the present disclosure, a cargo body is provided including a composite floor assembling comprising a plurality of transverse beams, a first plurality of connectors embedded in the plurality transverse beams, and a first longitudinal beam oriented generally orthogonal to the plurality of transverse beams, each of the first plurality of connectors positioned adjacent the longitudinal beam.

According to another exemplary embodiment of the present disclosure, a cargo body is provided including a composite floor assembly, a plurality of connectors embedded in the composite floor assembly, a plurality of connectors embedded in the composite floor assembly, and a landing gear assembly coupled to the plurality of connectors using a plurality of mechanical fasteners.

According to a further exemplary embodiment of the present disclosure, a cargo body is provided including a composite flooring comprising a plurality of beams, and a slide rail assembly coupled to the plurality of connectors using a plurality of mechanical fasteners.

According to another exemplary embodiment of the present disclosure, a method is provided for manufacturing a composite floor assembly with at least one embedded connector. The method includes positioning at least a first connector and a second connector in an outer skin, the second connector spaced apart from the first connector, introducing an expandable core material into the outer skin, expanding the core material around the at least first and second connectors in the outer skin to form a composite beam with the at least first and second connectors embedded therein, and arranging the composite beam with a plurality of additional composite beams to form a composite floor assembly.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 2 is a bottom plan view of the exemplary semi-trailer of FIG. 1, shown with a landing gear assembly and a slide rail assembly coupled to the composite floor assembly;

FIG. 3 is a bottom plan view of the composite floor assembly of FIG. 1, shown without the landing gear assembly and the slide rail assembly;

FIG. 14 is a partial rear view of the landing gear assembly of FIG. 12 coupled to a transverse composite beam of FIG. 12, with an embedded connector shown in phantom.

Figure 1:
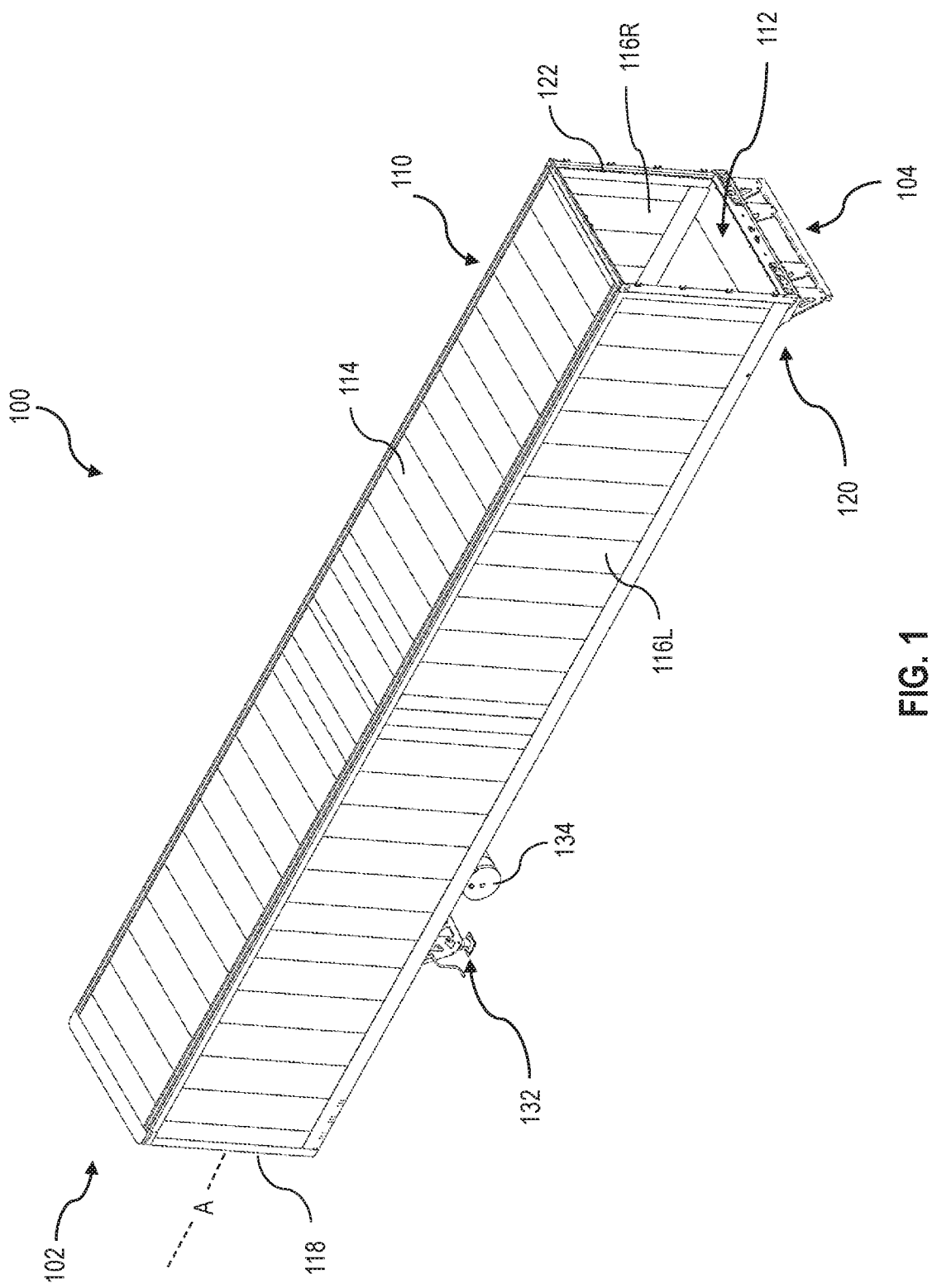
FIG. 1 is a top perspective view of an exemplary semi-trailer of the present disclosure including a composite floor assembly.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Semi-Trailer

Referring initially to FIG. 1, a semi-trailer 100 is shown for supporting and transporting cargo. The illustrative trailer 100 extends along a longitudinal axis A from a front end 102 to a rear end 104. The illustrative trailer 100 includes a cargo body 110 with a floor assembly 112, a roof 114, a right sidewall 116R, a left sidewall 116L, a front wall or nose 118, and a rear door assembly 120 having a rear frame 122 and a door (not shown) to access the cargo body 110.

Moving from the front end 102 to the rear end 104, the trailer 100 also includes a coupler assembly (not shown) configured to couple the cargo body 110 to a motorized tractor or another vehicle (not shown), a landing gear assembly 132 configured to support the cargo body 110 on the ground, a fuel tank assembly 134, and a slide rail assembly 136 (see FIG. 2) configured to couple the cargo body 110 to a rear wheel assembly (not shown). The front end 102 of the cargo body 110 may be supported atop the tractor (not shown) via the coupler assembly (not shown) in a transport condition or atop the landing gear assembly 132 in a stationary condition, and the rear end 104 of the cargo body 110 may be supported atop the wheel assembly (not shown) in either the transport or the stationary condition.

In the illustrated embodiment of FIG. 1, cargo body 110 of trailer 100 is an enclosed body. The cargo body 110 may be refrigerated and/or insulated to transport temperature-sensitive cargo. While the concepts of this disclosure are described in relation to a refrigerated trailer 100, it will be understood that they are equally applicable to other vehicles generally, and more specifically to conventional trailers (e.g., dry freight trailers, flatbed trailers, commercial trailers, small personal trailers) and/or box or van semi-trailers, and the like. Accordingly, those skilled in the art will appreciate that the present invention may be implemented in a number of different applications and embodiments and is not specifically limited in its application to the particular embodiments depicted herein.

Trailer 100 may have various features in common with the vehicles shown and described in International Publication No. WO 2016/137974 and U.S. Patent Application Publication No. 2017/0240217, the disclosures of which are expressly incorporated herein by reference in their entirety.

2. Composite Materials

The cargo body 110 of trailer 100 may be constructed, at least in part, of composite materials. For example, the floor assembly 112, roof 114, right sidewall 116R, left sidewall 116L, and/or nose 118 of cargo body 110 may be constructed of composite materials. As such, the floor assembly 112, roof 114, right sidewall 116R, left sidewall 116L, and/or nose 118 of cargo body 110 may be referred to herein as composite structures.

Composite materials are generally formed by combining two or more different constituents that remain separate and distinct in the final composite material. Exemplary composite materials for use in the composite cargo body 110 include fiber-reinforced plastics (FRP), for example carbon-fiber-reinforced plastics (CRP). Each composite structure may be a single, unitary component, which may be formed from a plurality of constituents or layers permanently coupled together. Other elements of the cargo body 110 may be constructed of non-composite (e.g., metallic) materials. For example, the rear door assembly 120 of the cargo body 110 may be constructed of metallic materials.

The composite construction of the cargo body 110 may present certain advantages. First, because the composite structures may lack structural metallic components, the composite cargo body 110 may have a reduced heat loss coefficient (Ua) and improved thermal efficiency. Also, the composite cargo body 110 may operate to minimize outgassing of blowing agents, minimize air loss, and minimize water intrusion. Additionally, the composite cargo body 110 may be lighter in weight than a typical metallic cargo body, which may improve fuel efficiency. Further, the composite cargo body 110 may have fewer metallic structures than a typical cargo body, which may make the cargo body 110 less susceptible to corrosion. Also, the composite cargo body 110 may include fewer parts than a typical metallic cargo body, which may simplify construction, reduce inventory, and reduce variation in manufacturing. Further, the composite cargo body 110 may be suitable for use with sensitive cargo, including foodstuffs, because the composite materials may be inert to avoid reacting with the cargo and other materials and because the composite materials may be easy to clean and maintain to ensure proper hygiene. As a result, the composite cargo body 110 may qualify as "food grade" equipment.

The composite structures of the present disclosure may contain one or more structural supports or preforms. The preform may have a structural core that has been covered with an outer fabric layer or skin. The outer skin may be stitched or otherwise coupled to the underlying core and/or any surrounding layers. The core may be extruded, pultruded, or otherwise formed into a desired shape and cut to a desired length. In an exemplary embodiment, the core is a polyurethane foam material or another foam material, and the outer skin is a non-woven spun bond polyester material, a fiberglass fabric, or another suitable material. Advantageously, in addition to its structural effect, the foam core may have an insulating effect in certain applications, including refrigerated trucking applications. Exemplary preforms include PRISMA® preforms provided by Compsys, Inc. of Melbourne, Fla.

Both the core and the outer skin of the preform may be selected to accommodate the needs of the particular application. For example, in areas of the final structure requiring more strength and/or insulation, a low-density foam may be replaced with a high-density foam or a hard plastic block.

The individual preforms may also be sized, shaped, and arranged in a manner that accommodates the needs of the particular application. For example, in areas of the final structure requiring less strength, the preforms may be relatively large in size, with the foam cores spanning relatively large distances before reaching the surrounding outer skins. By contrast, in areas of the final structure requiring more strength, the preforms may be relatively small in size, with the foam cores spanning relatively small distances before reaching the surrounding outer skins. Stated differently, the preforms may be shaped as relatively wide panels in areas of the final structure requiring less strength and as relatively narrow support beams in areas of the final structure requiring more strength.

The composite structures of the present disclosure may also contain one or more reinforcing materials or layers around the preforms. Each reinforcing layer may contain reinforcing fibers and may be capable of being impregnated and/or coated with a resin, as discussed further in Section 8 below. Suitable fibers include carbon fibers, glass fibers, cellulose, or polymers, for example. The fibers may be present in fabric form, which may be mat, woven, non-woven, or chopped, for example. Exemplary reinforcing layers include chopped fiber fabrics, such as chopped strand mats (CSM), and continuous fiber fabrics, such as 0°/90° fiberglass fabrics, +45°/−45° fiberglass fabrics, +60°/−60° fiberglass fabrics, 0° warp unidirectional fiberglass fabrics, and other stitched fiber fabrics, for example. Such fabrics are commercially available from Vectorply Corporation of Phenix City, Ala. Exemplary fabrics include the E-LM 1810 fiberglass fabric with 0° unidirectional fibers, the E-LTM 3610 fiberglass fabric with 0°/90° fibers, and the E-LTM 2408 fiberglass fabric with 0°/90° fibers, for example.

According to an exemplary embodiment of the present disclosure, a plurality of different reinforcing layers may be stacked together and used in combination. For example, a chopped fiber fabric (e.g., CSM) may be positioned adjacent to a continuous fiber fabric. In this stacked arrangement, the chopped fibers may help support and maintain the adjacent continuous fibers in place, especially around corners or other transitions. Also, the chopped fibers may serve as a web to resist column-type loads in compression, while the adjacent continuous fibers may resist flange-type loads in compression. Adjacent reinforcing layers may be stitched or otherwise coupled together to simplify manufacturing, to ensure proper placement, and to prevent shifting and/or bunching.

3. Composite Floor Assembly

Floor assembly 112 is shown in more detail in FIGS. 2 and 3. The illustrative floor assembly 112 includes a lower surface 200 that faces downward toward the ground when in use. The illustrative floor assembly 112 also includes an upper surface or platform 202 (see FIG. 5) that faces upward when in use to support cargo or other objects. The illustrative floor assembly 112 has a generally rectangular outer perimeter 201 with a width W, a length L, and a height H between the lower surface 200 and the upper surface 202 (see FIG. 5), although this shape may vary. As discussed in Section 2 above and Section 8 below, floor assembly 112 may be a composite structure that is constructed, at least in part, of composite materials.

As shown in FIG. 3, the exemplary floor assembly 112 includes a plurality of transverse composite beams 212. Illustratively, each of the plurality of transverse composite beams 212 is oriented generally orthogonal to longitudinal axis A. More specifically, each of the plurality of transverse composite beams 212 extend in a direction perpendicular to longitudinal axis A with longitudinal ends 213R, 213L positioned along outer perimeter 201 of floor assembly 112 and adjacent to sidewalls 116R, 116L, respectively. The individual transverse composite beams 212 may be constructed in accordance with Section 2 above and Section 8 below. Specifically, each transverse composite beams 212 may be a preform of a structural core wrapped in an outer skin.

The plurality of transverse composite beams 212 includes a first subset of forward beams 214, specifically forward beams 214a-d, and a second subset of rearward beams 216, specifically rearward beams 216a-f. In the exemplary embodiment shown, beams 214, 216 are longitudinally spaced apart from one another along longitudinal axis A. More specifically, beams 214, 216 are intermixed with and separated by the remainder of the plurality of transverse composite beams 212 such that the beams 214, 216 are longitudinally spaced apart along cargo body 110.

As discussed in Section 2 above, the individual transverse composite beams 212, 214, 216 may be sized, shaped, and arranged in a manner that accommodates the needs of the particular application. For example, a relatively large number of small, closely-spaced beams may be used for high-weight/high-strength applications, whereas a relatively small number of large and/or spaced-apart beams may be used for low-weight/low-strength applications.

4. Longitudinal Beams

As shown in FIG. 2, cargo body 110 includes a first and second longitudinal main beam 150L, 150R extending downward from bottom surface 200 of floor assembly 112 along the length L of cargo body 110 parallel to longitudinal axis A and oriented generally orthogonal to the plurality of transverse composite beams 212, 214, 216. Longitudinal main beams 150L, 150R are illustratively positioned laterally inward of longitudinal ends 213R, 213L of the plurality of composite beams 212, 214, 216, which correspond to sidewalls 116R, 116L of cargo body 110 (see FIG. 1). In the exemplary embodiment shown, longitudinal main beams 150L, 150R are positioned laterally intermediate longitudinal axis A and longitudinal ends 213R, 213L. That said, the lateral position of longitudinal main beams 150L, 150R relative to longitudinal axis A and longitudinal ends 213R, 213L of the lateral sides of cargo body 112 may be adjusted depending on the specific application and components of cargo body 110. Furthermore, the individual longitudinal main beams 150L, 150R may be constructed in accordance with Section 2 above and Section 8 below. Specifically, each longitudinal main beam 150L, 150R may be a preform of a structural core wrapped in an outer skin.

An advantage, among others, of longitudinal main beams 150L, 150R is that longitudinal main beams 150L, 150R provide stiffness along the length L of floor assembly 112. Another advantage, among others, of longitudinal main beams 150L, 150R is that longitudinal main beams 150L, 150R provide a coupling surface for components of cargo body 110. For example, slide rail assembly 136 is coupled to a rear portion of longitudinal main beams 150L, 150R near rear end 104. Illustratively, slide rail assembly is adhesively coupled to longitudinal main beams 150L, 150R using a structural adhesive. In another embodiment, slide rail assembly 136 is mechanically coupled to longitudinal main beams 150L, 150R using at least one fastener such as, for example, a bolt or screw. Additional details regarding slide rail assembly 136 coupling to longitudinal main beams 150L, 150R may be found in Section 7 below.

In the exemplary embodiment shown, cargo body 110 includes additional longitudinal beams 152L, 152R, 153. Longitudinal beams 152L, 152R, 153 extend along a shorter length of floor assembly 112 relative to longitudinal main beams 150L, 150R. More specifically, longitudinal beams 152L, 152R, 153 are positioned near front end 102 of cargo body 110 without extending entirely to rear end 104 of cargo body 110. In the exemplary embodiment shown, longitudinal beams 152L, 152R, 153 provide a coupling surface for components of cargo body 110 such as, for example, landing gear assembly 132 and fuel tank assembly 134 (see FIG. 1). Additional details regarding landing gear assembly 132 coupling to longitudinal beams 152L, 152R may be found in Section 6 below. Another advantage, among others, of longitudinal beams 152L, 152R, 153 is that longitudinal beams 152L, 152R, 153 provide additional stiffness to floor assembly 112 near front end 102 (i.e., the area of landing gear assembly 132 and fuel tank assembly 134).

Similar to the transverse composite beams 212, the individual longitudinal beams 150L, 150R, 152L, 152R, 153 may be sized, shaped, and arranged in a manner that accommodates the needs of the particular application. For example, longitudinal main beams 150L, 150R may extend only along a portion of the length L of cargo body 110. In another embodiment, longitudinal beams 152L, 152R, 153 are sized and arranged to accommodate an additional fuel tank assembly or other accessory positioned, for example, laterally opposite fuel tank assembly 134.

5. Embedded Hardpoint Connectors

Floor assembly 112 may include one or more embedded hardpoint connectors 300, as shown in FIG. 3. Connectors 300 may serve as fasteners or anchors for mechanically coupling other components of trailer 100 to floor assembly 112, such as rear door assembly 120 (FIG. 1), a coupler assembly (not shown), landing gear assembly 132 (FIGS. 1 and 2) or 332 (FIGS. 12-14), fuel tank assembly 134 (FIG. 1), slide rail assembly 136 (FIGS. 2 and 7), and/or a suspension assembly (not shown), for example.

Each connector 300 may be configured to receive one or more mechanical fasteners 301 (FIG. 5) from the adjacent component. Suitable mechanical fasteners 301 include bolts, screws, rivets, and nails, for example. In certain embodiments, connectors 300 may include pre-tapped holes (not shown) capable of receiving mechanical fasteners 301. Depending on the needs of the particular application, mechanical fasteners 301 may be used alone or in combination with structural adhesives. Mechanical fasteners 301 may be desired when the adjacent component will be susceptible to peeling, whereas structural adhesive may be desired when the adjacent component will be susceptible to shear loads. When used alone, the mechanical fasteners 301 may facilitate efficient and inexpensive assembly and repairs of trailer 100. When used in combination with structural adhesive, the mechanical fasteners 301 may also serve as clamps to stabilize trailer 100 during curing of the structural adhesive.

In the exemplary embodiment of FIG. 3, connectors 300 are illustratively embedded in a select group of beams of the plurality of transverse composite beams 212. More specifically, connectors 300 are embedded in beams 214, 216, which comprise a first and second subset of the plurality of beams 212. The remaining beams 212 may lack embedded connectors 300. As referenced above, one or more beams 212 lacking embedded connectors 300 may be arranged between the beams 214, 216 having embedded connectors 300 such that the connectors 300 are longitudinally spaced apart along cargo body 110.

Illustratively, connectors 300 comprise a generally planar body or plate and are embedded in lower surface 200 of composite floor 112, more specifically within beams 214, 216 themselves. In an alternative embodiment, connectors 300 are embedded in another surface or span two or more surfaces of beams 214,216. Accordingly, connectors 300 may also be C-shaped, T-shaped, pi-shaped, bent, tubular, or other suitable shapes. The connectors 300 may be embedded in beams 214, 216 in accordance with Section 8 below.

In the exemplary embodiment shown, each beam 214, 216 includes a plurality of embedded connectors 300, illustratively between two and four embedded connectors 300. Generally, connectors 300 are spaced apart from one another along the longitudinal length of each beam 214, 216. For example, connectors 300 may be positioned intermediate longitudinal axis A and a respective longitudinal end 213L, 213R of beams 214, 216. More specifically, connectors 300 are positioned laterally inward of longitudinal ends 213L, 213R of beams 214, 216 (corresponding to the lateral sidewalls 116L, 116R of cargo body 110 (see FIG. 1)). That said, the position and number of connectors 300 along the length of each beam 214, 216 may be adjusted for the required application. Moreover, the subsets of beams 214, 216 with embedded connectors 300 may be more or fewer than the number of selected beams 214, 216 shown in FIG. 3.

Connectors 300 may be constructed of metallic materials (e.g., steel, aluminum, titanium), polymeric materials, wood, or composite materials. In certain embodiments, connectors 300 are constructed of materials which are dissimilar from the composite material used to construct the corresponding beams. Connectors 300 may be fabricated by extrusion, pultrusion, sheet forming, roll forming, and/or casting, for example. Connectors 300 may also be single-piece or multi-piece constructs. For multi-piece constructs, the pieces may be welded, mechanically fastened, adhered, snap-fit, or otherwise coupled together.

6. Landing Gearing Assembly

Figure 4:
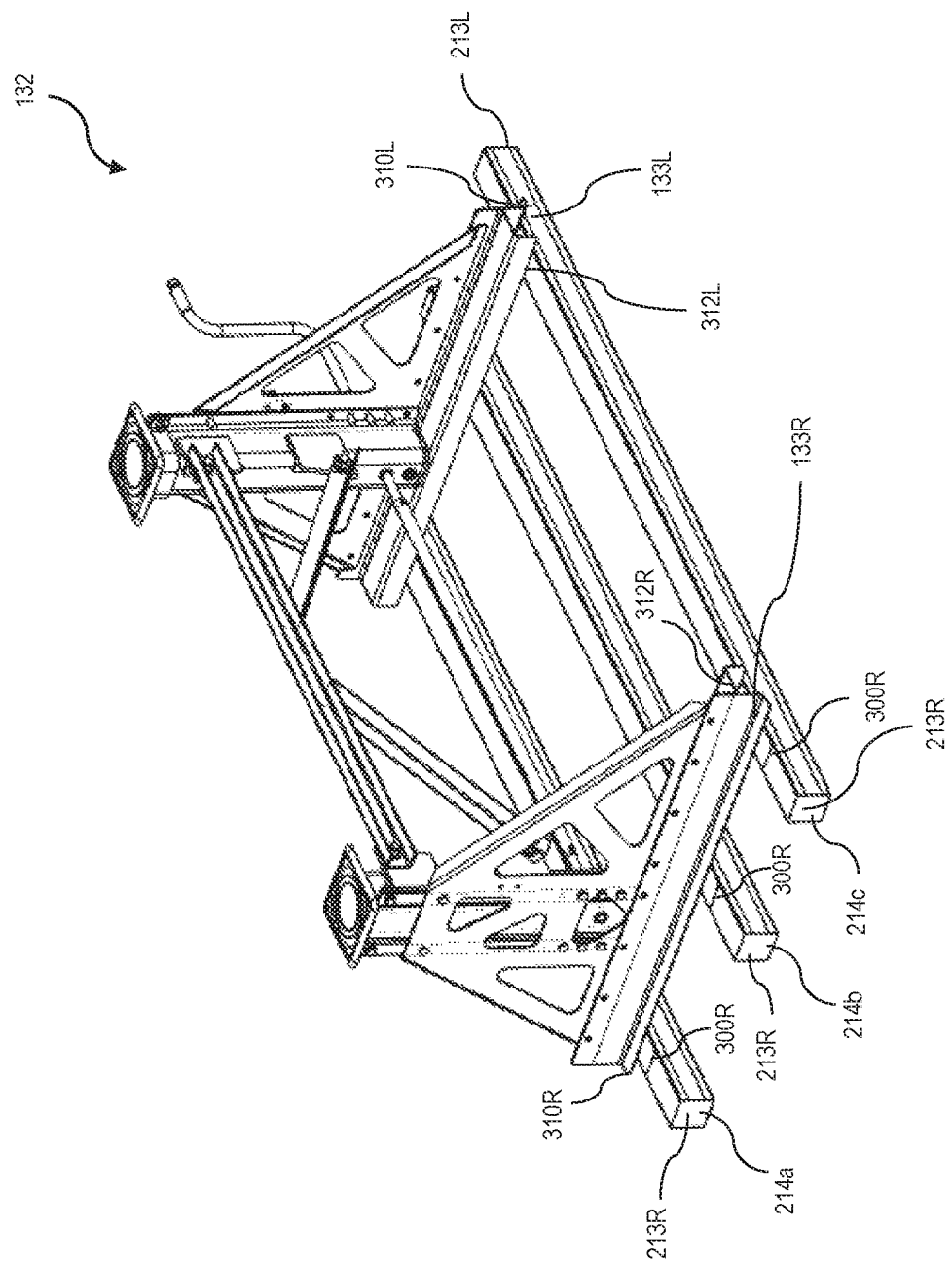
FIG. 4 is a bottom perspective view of the landing gear assembly coupled to a plurality of transverse composite beams of the composite floor assembly.
Figure 5:
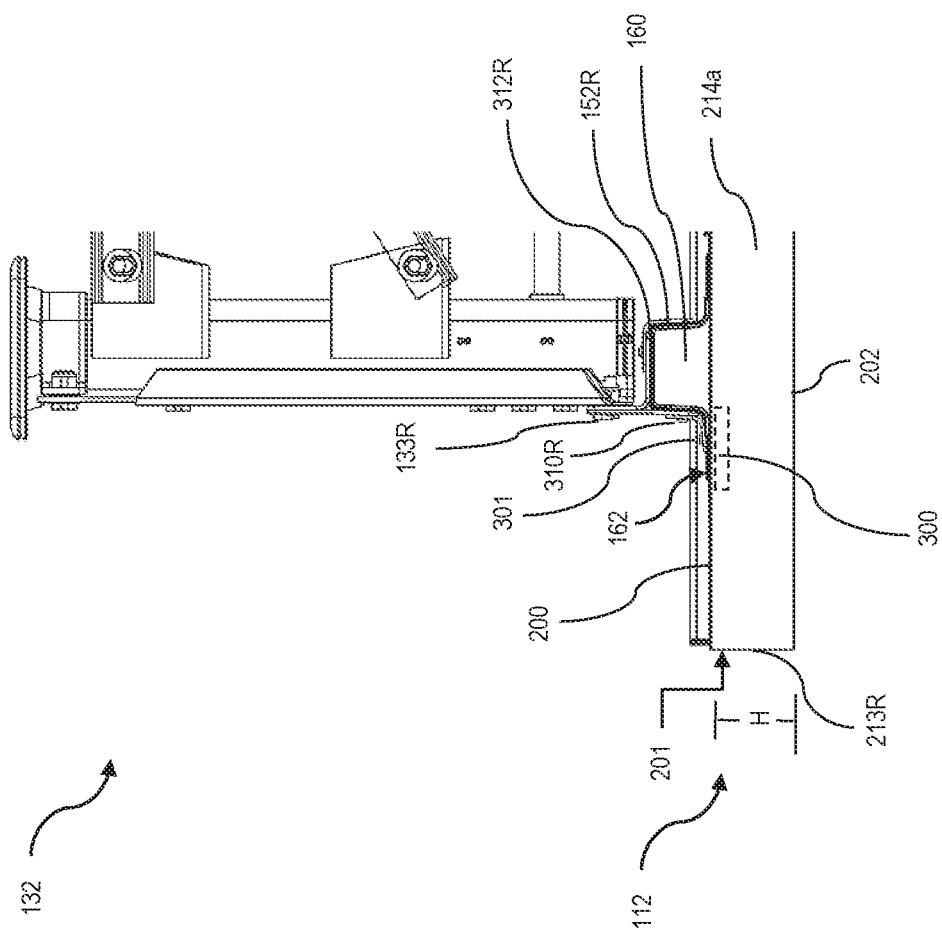
FIG. 5 is a partial rear view of the landing gear assembly coupled to a transverse beam of FIG. 4, with an embedded connector shown in phantom.
Figure 6:
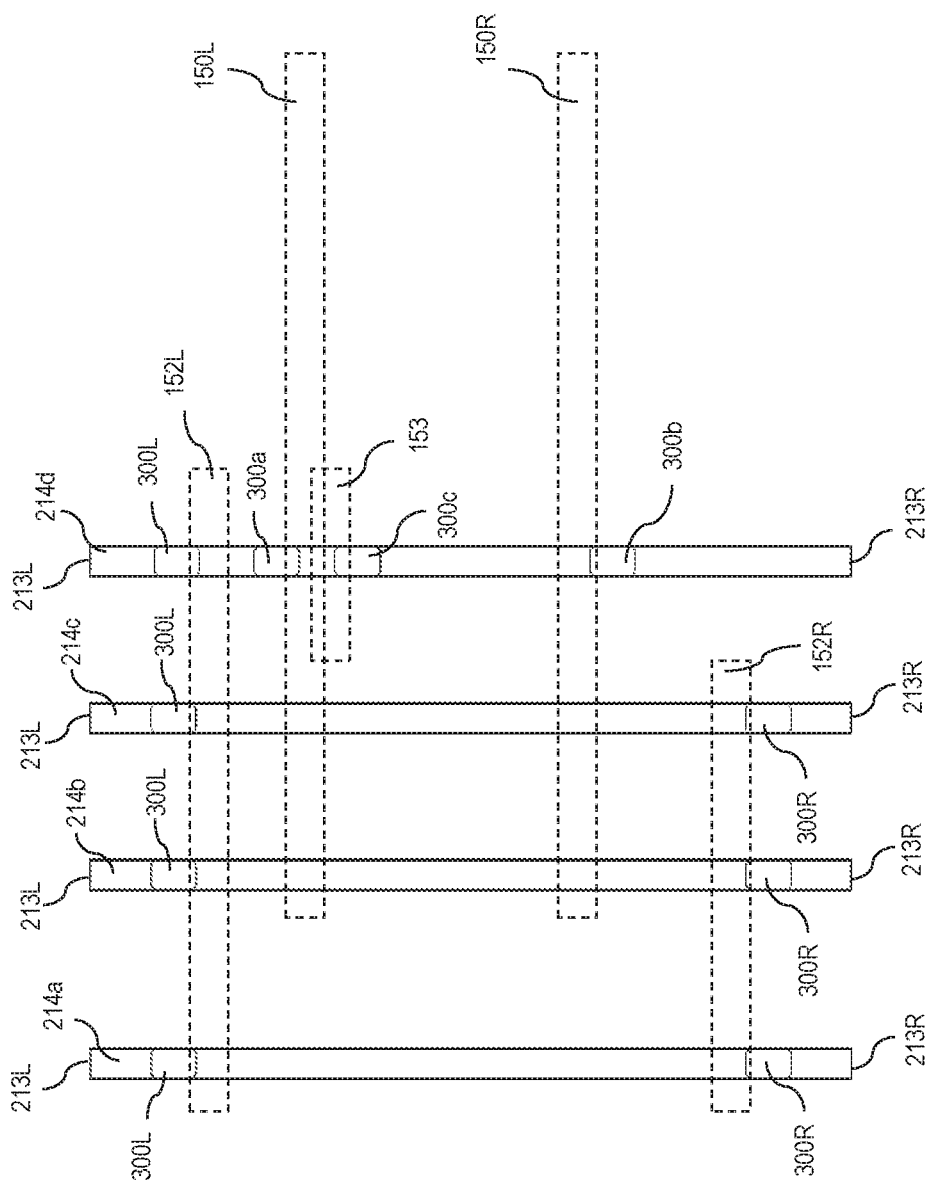
FIG. 6 is a diagrammatic view of a plurality of transverse composite beams and embedded connectors, with a plurality of longitudinal beams shown in phantom.

Turning now to FIGS. 4-6, an exemplary landing gear assembly 132 is provided for use with front beams 214 of floor assembly 112. As discussed above, landing gear assembly 132 may be used to support the cargo body 110 on the ground.

The illustrative landing gear assembly 132 includes mounting brackets 133L, 133R, each having at least one horizontal portion 310 and a U-shaped portion 312. The horizontal portion 310 of each mounting bracket 133L, 133R is mechanically coupled to connectors 300 embedded in beams 214a, 214b, 214c using a plurality of mechanical fasteners 301. In addition, the U-shaped portion 312 of each mounting bracket 133L, 133R wraps around at least a portion of and is adhesively coupled to the corresponding longitudinal beam 152L, 152R using a structural adhesive, for example, and/or mechanical fasteners.

As shown in FIG. 6, longitudinal beams 150, 152, 153 are positioned laterally inward of longitudinal ends 213L, 213R of beams 214. Moreover, longitudinal main beams 150L, 150R are positioned laterally inwards of longitudinal beams 152L, 152R. In the exemplary embodiment shown, longitudinal beam 153 is positioned laterally inward of longitudinal main beams 150L, 150R. Furthermore, connectors 300 are positioned adjacent their respective longitudinal beam. For example, connectors 300L are positioned adjacent and laterally outward of longitudinal beam 152L and connectors 300R are positioned adjacent and laterally outward of longitudinal beam 152R. Similarly, connector 300a is positioned adjacent and laterally outward of longitudinal main beam 150L and connector 300b is positioned adjacent and laterally outward of longitudinal main beam 150R. Connector 300c is positioned adjacent and laterally inward of longitudinal beam 153. As a result, connectors 300 are positioned laterally intermediate their respective one of longitudinal beams 150, 152, 153 and outer perimeter 201 of floor assembly 112.

Referring back to FIG. 5, longitudinal beam 152R includes a core material 160 extending along the longitudinal length of longitudinal beam 152R. Core material 160 may comprise a foam, for example. Connectors 300R are positioned laterally adjacent core material 160. Depending on the size and shape of connectors 300 and/or longitudinal beams 150, 152, 153, core material 160 may be entirely offset from or may overlap at least a portion of connectors 300 when connectors 300 are embedded in beams 214. In the exemplary embodiment shown, longitudinal beam 152R further includes an outer skin 162 surrounding at least a portion of core material 160 and coupled to lower surface 200 of floor assembly 112. Outer skin 162 may comprise a fiberglass fabric, for example. Connectors 300R may be aligned with outer skin 162 of longitudinal beam 152R when connectors 300R are embedded in beams 214. Like the landing gear assembly 132, the fuel tank assembly 134 (FIG. 1) may be coupled to front transverse beams 214 of floor assembly 112. For example, the fuel tank assembly 134 may be adhesively coupled to longitudinal beams 152L and 153 (at a location rearward of the landing gear assembly 132) and mechanically coupled to the adjacent connectors 300L, 300c, respectively.

7. Slide Rail Assembly

Figure 7:
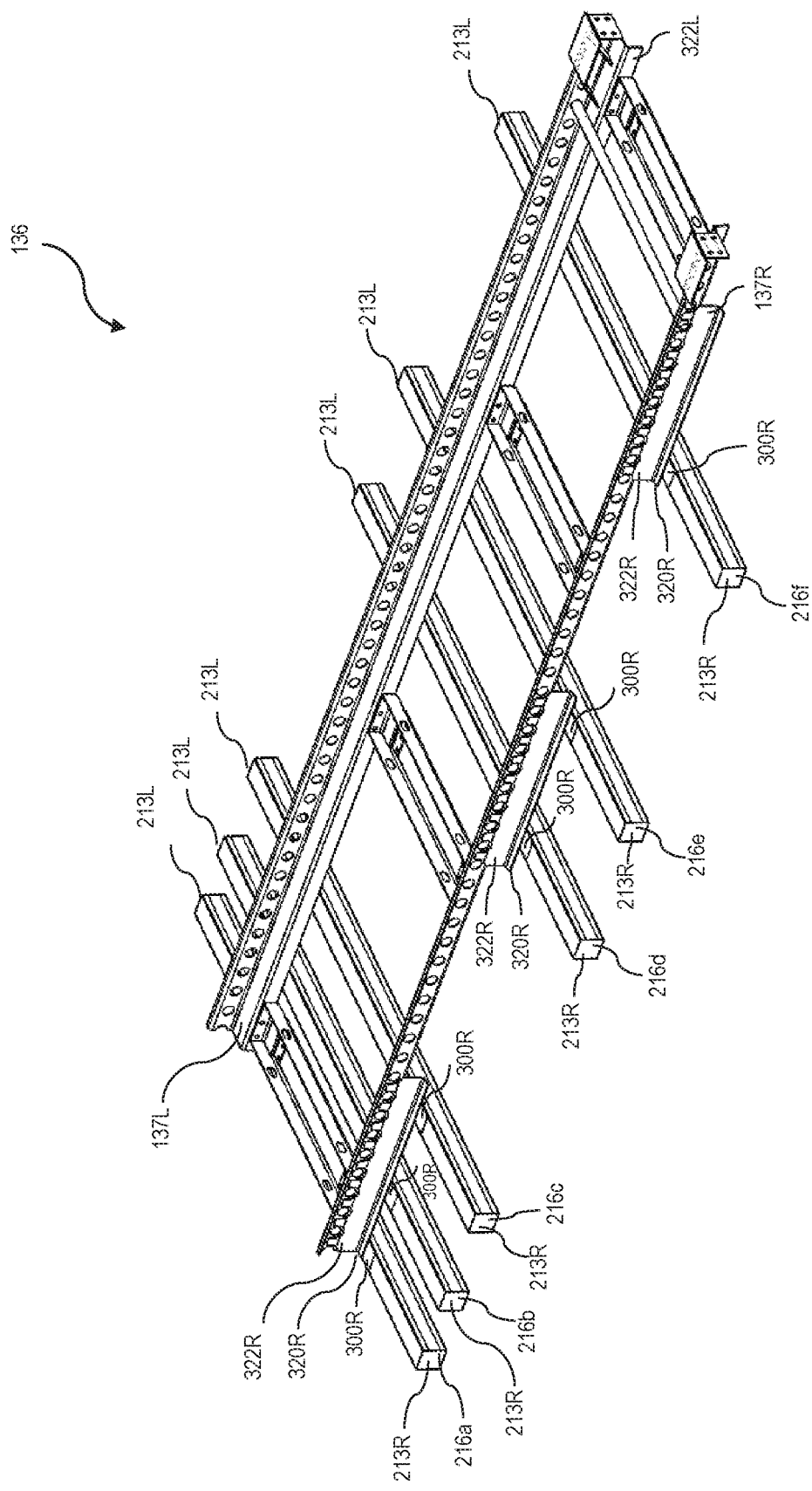
FIG. 7 is a perspective view of the slide rail assembly coupled to a plurality of connectors embedded in a plurality of transverse composite beams.
Figure 8:
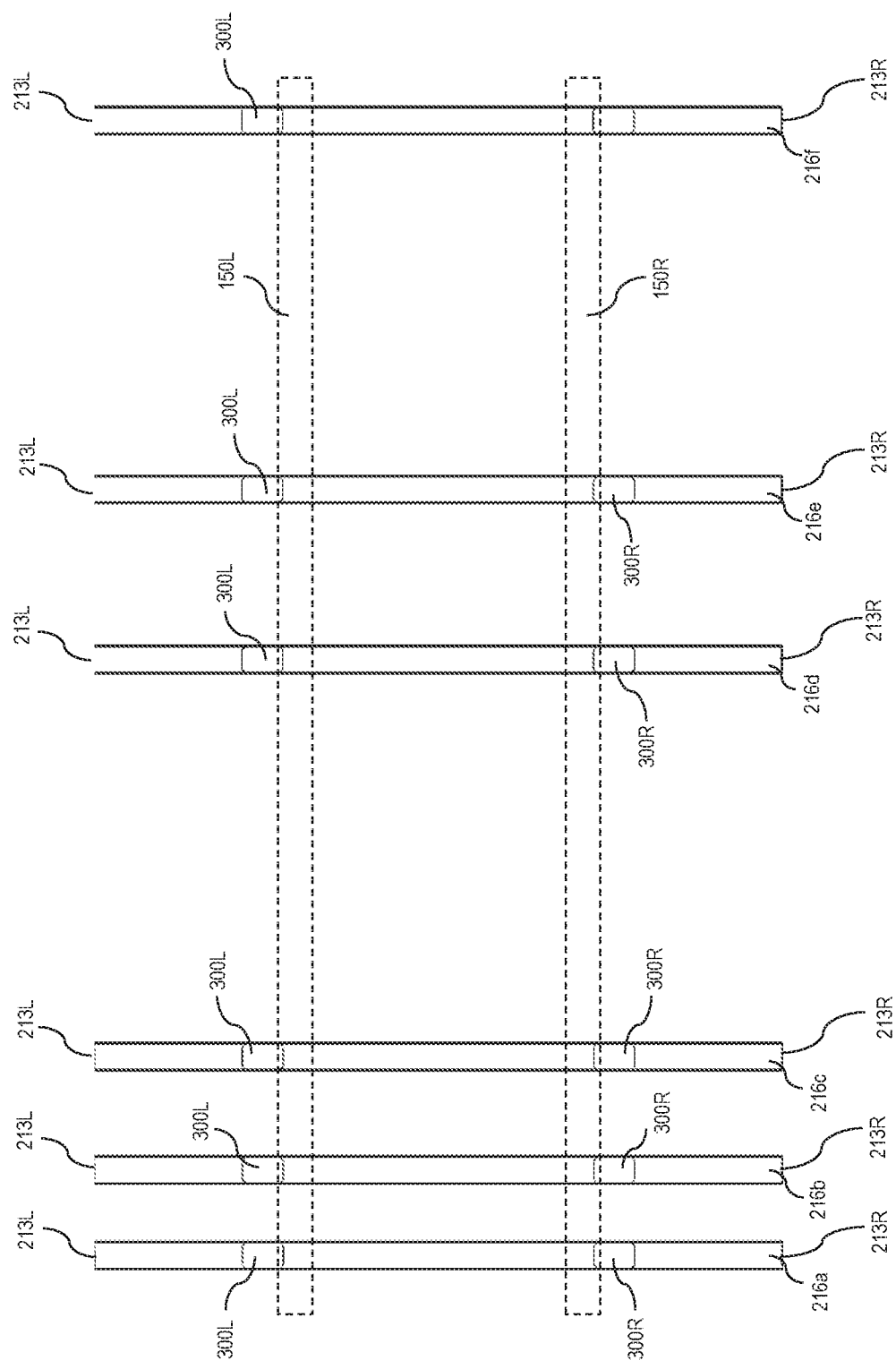
FIG. 8 is a diagrammatic view of a plurality of transverse composite beams and embedded connectors, with a plurality of longitudinal beams shown in phantom.
Figure 9:
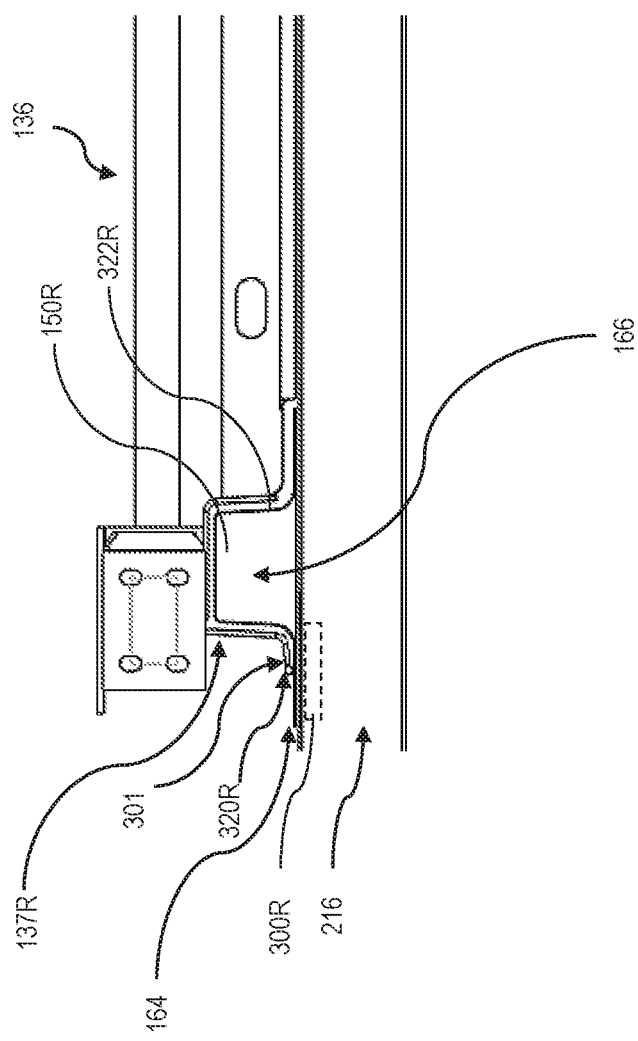
FIG. 9 is a partial rear view of the slide rail assembly coupled to a transverse composite beam of FIG. 8, with an embedded connector shown in phantom.

Referring next to FIGS. 7-9, an exemplary slide rail assembly 136 is provided for use with beams 216 of floor assembly 112. As discussed above, slide rail assembly may be used to couple cargo body 110 to a rear wheel assembly (not shown).

The illustrative slide rail assembly 136 includes mounting brackets 137L, 137R, each having at least one horizontal portion 320 and a U-shaped portion 322. The horizontal portion 320 of each mounting bracket 137L, 137R is mechanically coupled to connectors 300 embedded in beams 216a-f using a plurality of mechanical fasteners 301. In addition, the U-shaped portion 322 of each mounting bracket 137L, 137R wraps around at least a portion of and is adhesively coupled to the corresponding longitudinal main beam 150L, 150R using a structural adhesive, for example, and/or mechanical fasteners.

As shown in FIG. 8, longitudinal main beams 150L, 150R are positioned laterally inward of longitudinal ends 213L, 213R of beams 216. Connectors 300 are positioned adjacent their respective longitudinal beam. For example, connectors 300L are positioned adjacent and laterally outward of longitudinal main beam 150L and connectors 300R are positioned adjacent and laterally outward of longitudinal main beam 150R. As a result, connectors 300 are positioned laterally intermediate their respective one of longitudinal beams 150L, 150R and outer perimeter 201 of floor assembly 112.

Turning now to FIG. 9, longitudinal beam 150R includes core material 166 extending along the longitudinal length of longitudinal beam 150R. Core material 166 may comprise a foam, for example. Connectors 300R are positioned laterally adjacent core material 166. Depending on the size and shape of connectors 300 and/or longitudinal beams 150L, 150R, core material 166 may be entirely offset from or may overlap at least a portion of connectors 300 when connectors 300 are embedded in beams 216. In the exemplary embodiment shown, longitudinal beam 150R further includes an outer skin 164 surrounding at least a portion of core material 166 and coupled to lower surface 200 of floor assembly 112. Outer skin 164 may comprise a fiberglass fabric, for example. Connectors 300R may be aligned with outer skin 164 of longitudinal beam 152 when connectors are 300R are embedded in beams 214.

8. Composite Molding Process

Figure 10:
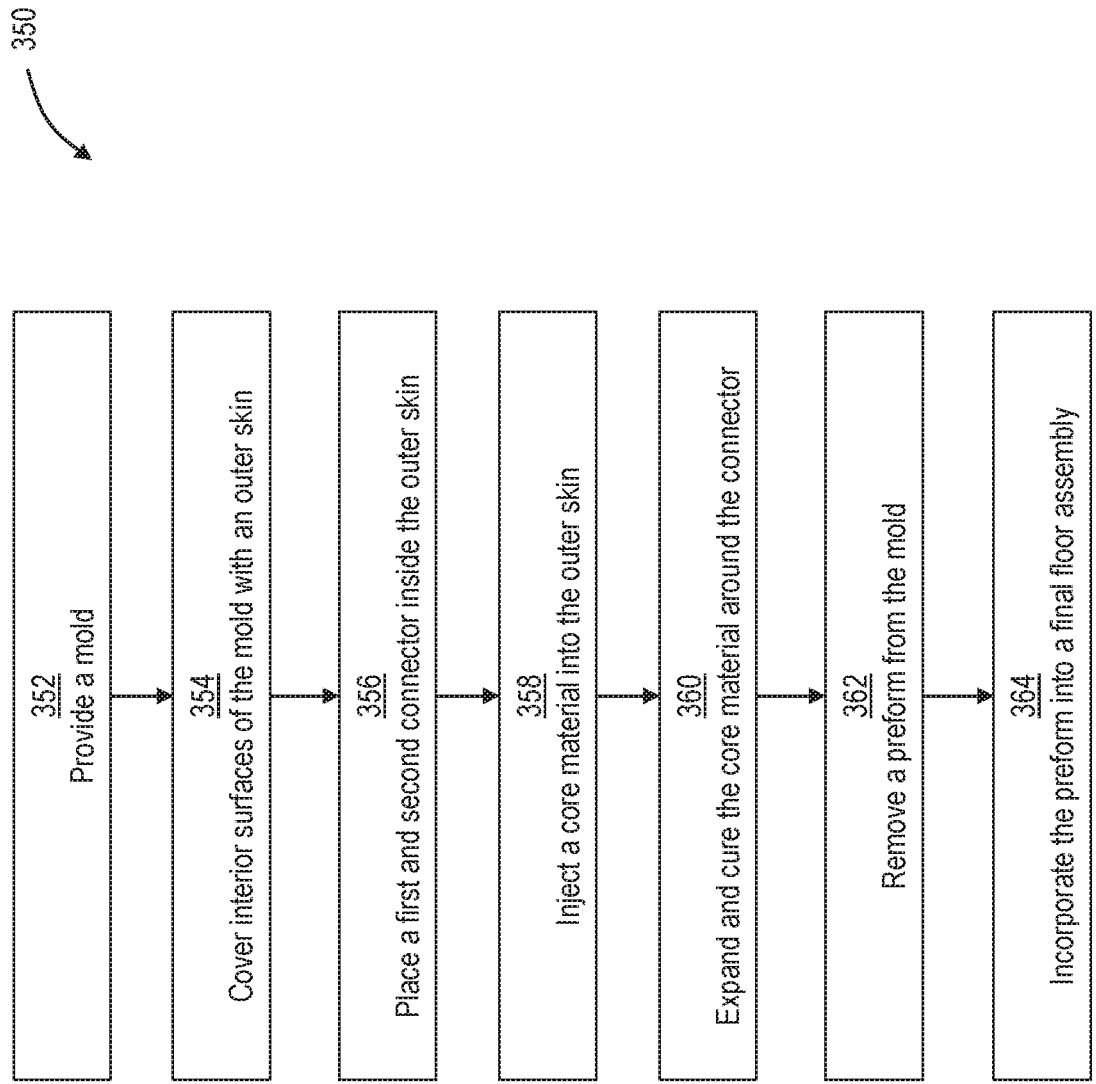
FIG. 10 is a flow chart of an exemplary method for manufacturing the composite floor assembly of the present disclosure.
Figure 11:
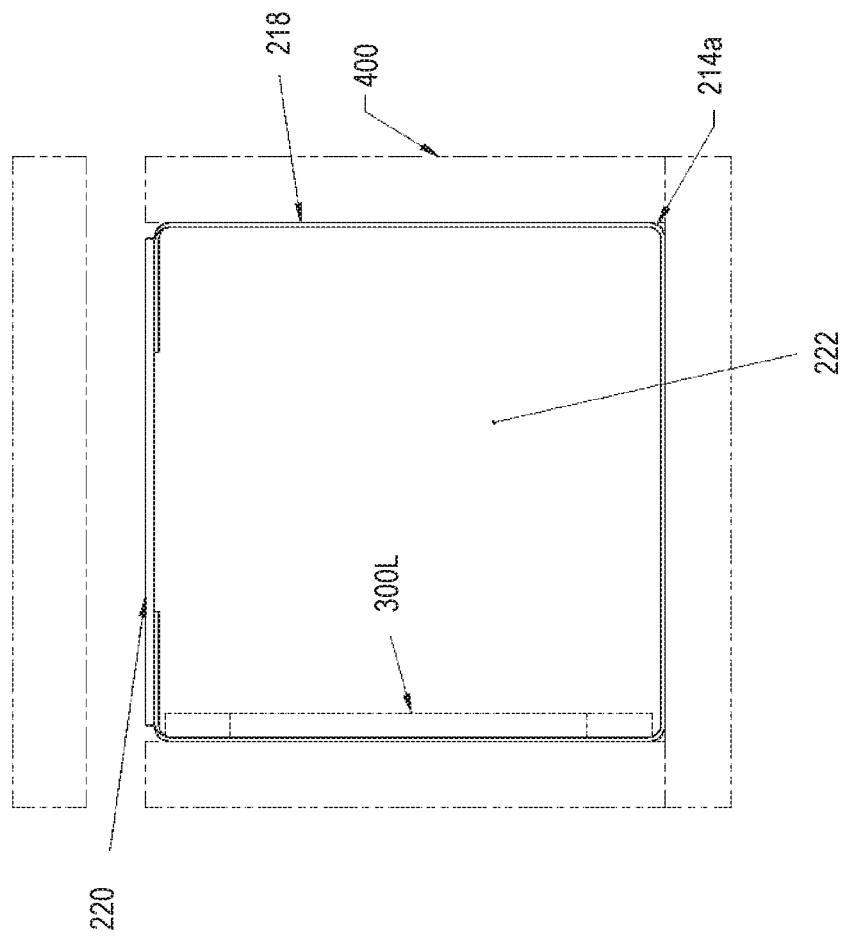
FIG. 11 is an end view of one of the composite transverse beams of FIG. 4, with a mold shown in phantom.

Turning now to FIGS. 10 and 11, the composite structures of the present disclosure may be formed by a molding process 350, as discussed further below.

The illustrative method 350 involves fabricating each transverse beam 212, 214a-d, 216a-f as a preform and then incorporating the preforms into the final floor assembly 112. At step 352, a mold 400 having a desired shape is provided. At step 354, interior surfaces of mold 400 are covered with outer skins 218, 220. Outer skins 218, 220 may comprise a fiberglass fabric, for example. Moreover, outer skins 218, 220 may be of the same or different fabric weight. For example, outer skin 220 may be of a heavier fabric weight than outer skin 218. At step 356, any desired connectors 300 are placed inside the outer skins 216, 218 in mold 400. With respect to the illustrative beam 214a of FIGS. 6 and 11, for example, connectors 300L, 300R (not shown in FIG. 11) are spaced apart from one another along the intended longitudinal length of beam 214a within mold 400. Step 356 may be omitted when forming a transverse beam 212 that lacks connectors 300. At step 358, the expandable core material 222 is injected or otherwise introduced into the outer skins 216, 218 to contact connectors 300, if present. At step 360, the core material 222 expands and cures within the outer skins 216, 218 and around connectors 300, if present, which holds connectors 300 in place. At step 362, a preform resembling the desired beam 212, 214a-d, 216a-f is removed from mold 400. At step 364, the preform is incorporated into the final floor assembly 112, which may involve arranging the preform with other preforms (e.g., beam 214a of FIG. 11 may be arranged with other beams 212, 214b-d, 216a-f) and reinforcing layers, wetting the materials with at least one resin and a catalyst to impregnate and/or coat the materials, and curing the materials to form the final floor assembly 112.

The resin used to construct the composite structure may be a typical thermoset resin, a co-cure resin containing a plurality of individual co-curing resins which may be selectively distributed throughout the composite structure during the molding process, or a combination thereof. Such co-cure resins may comprise one or more elastomer components, such as urethane, co-cured with one or more resin components, such as a vinyl ester, epoxy, or unsaturated polyester components. Exemplary co-cure resins are disclosed in U.S. Pat. No. 9,371,468 and U.S. Publication No. 2016/0263873, the disclosures of which are hereby incorporated by reference in their entirety. As used herein, "co-cured" refers to the reactions involved in curing the elastomer components take place essentially concurrently with the reactions involved in curing the one or more resin components. In certain embodiments, areas of the composite structure that will be susceptible to high stress may receive a resin with a relatively higher polyurethane content for strength, whereas other areas of the composite structure that provide bulk and section modulus may receive a lower cost rigid, polyester-based resin, such as an isophthalic polyester resin.

Additional information regarding the construction of composite structures is disclosed in the following patents and published patent applications, each of which is incorporated by reference in its entirety herein: U.S. Pat. Nos. 5,429,066, 5,664,518, 5,800,749, 5,830,308, 5,897,818, 5,908,591, 6,004,492, 6,013,213, 6,206,669, 6,496,190, 6,497,190, 6,543,469, 6,723,273, 6,755,998, 6,869,561, 6,911,252, 8,474,871, and 10,239,265.

9. Another Landing Gear Assembly

Figure 12:
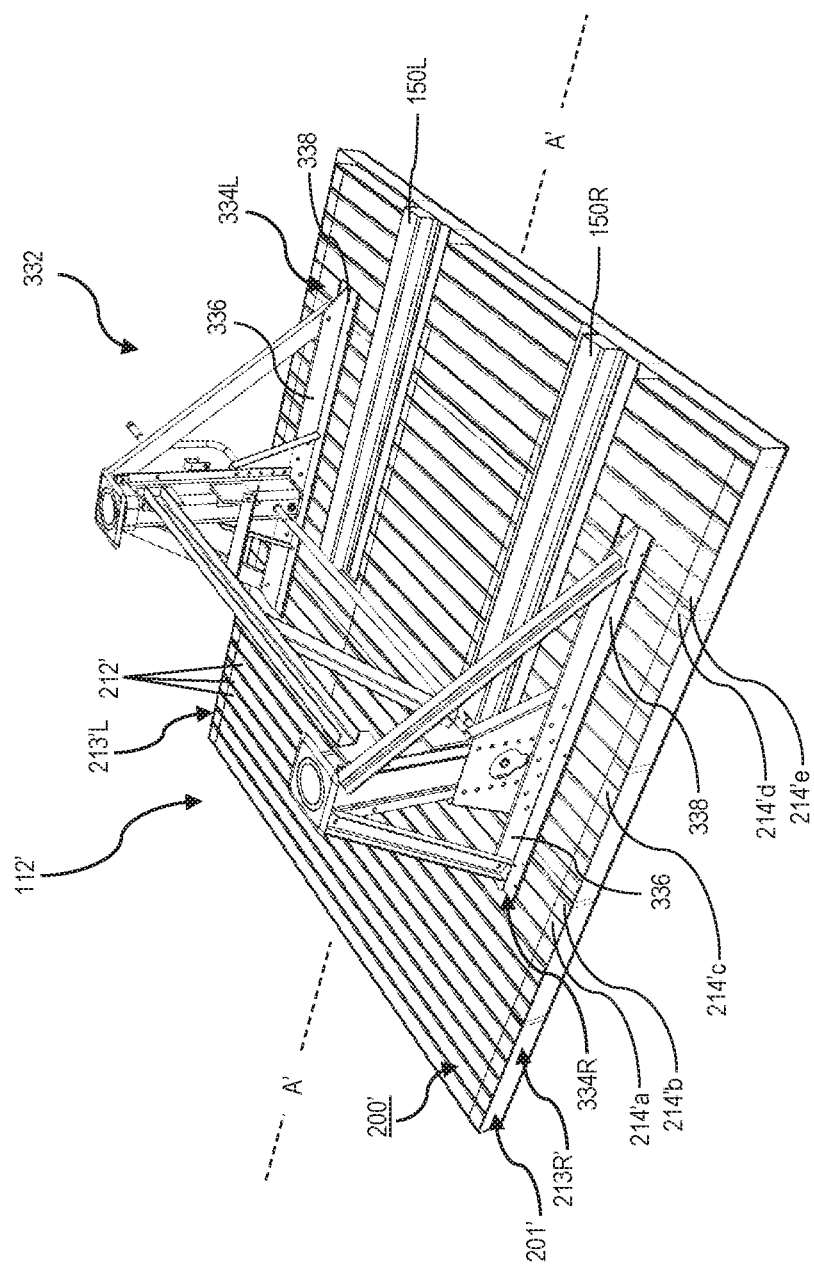
FIG. 12 is a bottom perspective view of another landing gear assembly coupled to a plurality of transverse composite beams of the composite floor assembly.
Figure 13:
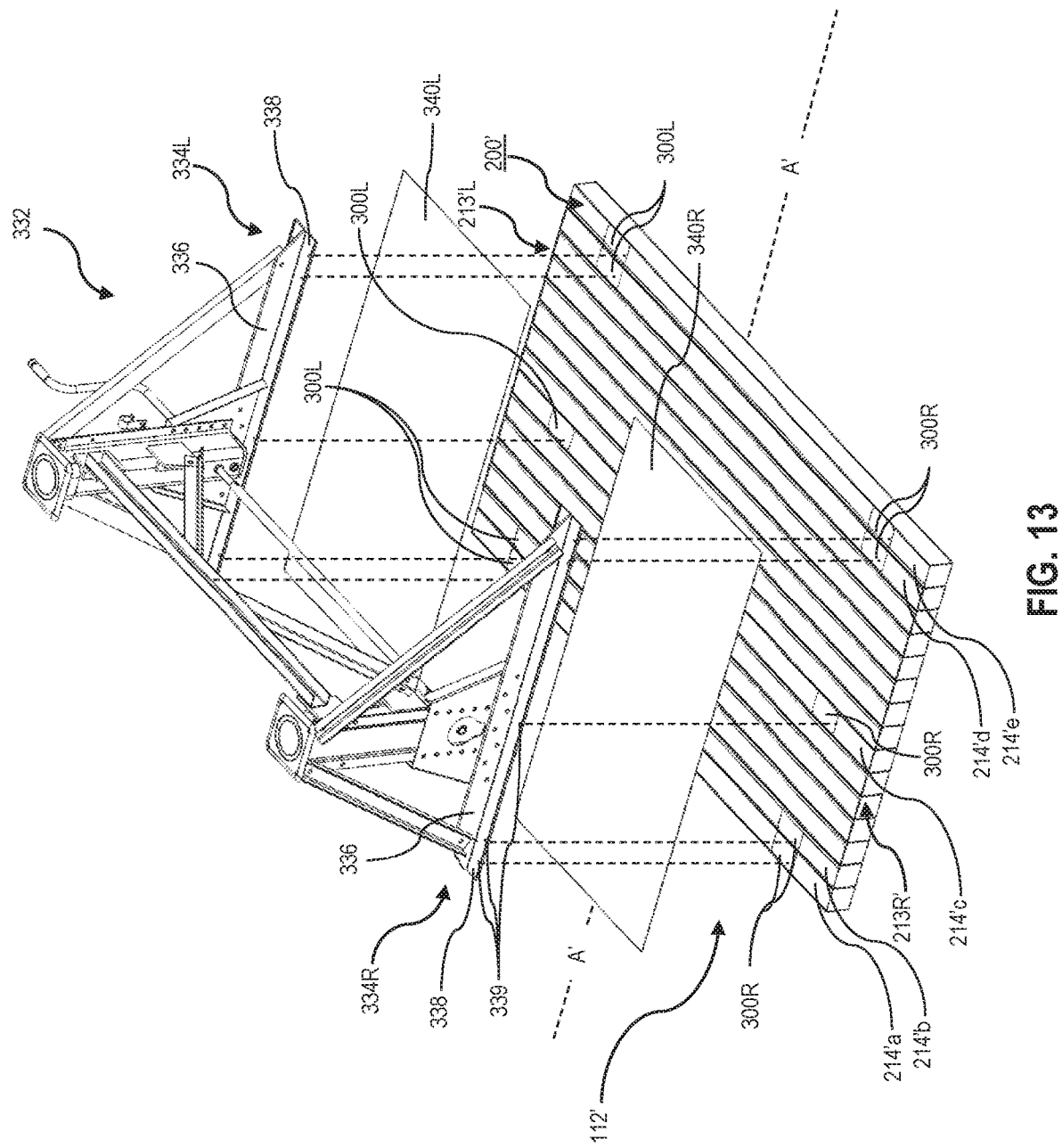
FIG. 13 is a partial exploded view of the landing gear assembly of FIG. 12 coupled to the plurality of transverse composite beams and including a fabric layer positioned between the landing gear assembly and the plurality of transverse composite beams.

Referring now to FIGS. 12-14, another landing gear assembly 332 is shown. Like landing gear assembly 132 (see FIGS. 4-6), landing gear assembly 332 may be used to support cargo body 110 on the ground.

Landing gear assembly 332 is illustratively coupled to a floor assembly 112'. Like floor assembly 112, floor assembly 112' includes a lower surface 200' that faces downward toward the ground when in use and an upper surface or platform 202' that faces upward when in use to support cargo or other objects. Floor assembly 112' has a generally rectangular outer perimeter 201', although this shape may vary. In the exemplary embodiment shown, floor assembly 112' extends axially along a longitudinal axis A' from front end 102 of trailer 100 to rear end 104 of trailer 100 (see FIG. 1). As discussed in Sections 2 and 8 above, floor assembly 112' may be a composite structure that is constructed, at least in part, of composite materials.

As shown in FIG. 12, floor assembly 112' includes a plurality of transverse composite beams 212'. Illustratively, each of the plurality of transverse composite beams 212' is oriented generally orthogonal to longitudinal axis A'. More specifically, each of the plurality of transverse composite beams 212' extend in a direction perpendicular to longitudinal axis A' with longitudinal ends 213'L, 213'R of transverse composite beams 212' positioned along outer perimeter 201' of floor assembly 112' and adjacent to sidewalls 116L, 116R, respectively, of cargo body 110 (FIG. 1). The individual transverse composite beams 212' may be constructed in accordance with Sections 2 and 8 above. Specifically, each transverse composite beam 212' may be a preform of a structural core wrapped in an outer skin.

Illustratively, the plurality of transverse composite beams 212' includes a first subset of beams 214', specifically beams 214'a-e, which are intermixed with the remainder of the plurality of transverse composite beams 212'. In the exemplary embodiment shown, forward beams 214'a, 214'b are positioned adjacent one another, intermediate beam 214'c is spaced apart from forward beams 214'a, 214'b along longitudinal axis A', and rearward beams 214'd, 214'e are positioned adjacent to one another and spaced apart from intermediate beam 214'c along longitudinal axis A'. As discussed in Section 2 above, the individual transverse composite beams 212', 214' may be sized, shaped, and arranged in a manner that accommodates the needs of the particular application. For example, a relatively large number of small, closely-spaced beams may be used for high-weight/high-strength applications, whereas a relatively small number of large and/or spaced-apart beams may be used for low-weight/low-strength applications.

Referring now to FIG. 13, floor assembly 112' includes a plurality of embedded hardpoint connectors 300, specifically connectors 300L, 300R that serve as fasteners or anchors for mechanically coupling landing gear assembly 332 to floor assembly 112'. As discussed in Section 3 above, floor assembly 112' may also include a second subset of rearward beams 216' having at least one connector 300 to which slide rail assembly 136 may be coupled.

Floor assembly 112' also includes longitudinal main beams 150L, 150R extending downward from bottom surface 200'. Longitudinal main beams 150L, 150R are oriented generally orthogonal to the plurality of transverse composite beams 212', 214' and generally parallel to longitudinal axis A'. Longitudinal main beams 150L, 150R are illustratively positioned laterally inward of longitudinal ends 213'L, 213'R of the plurality of composite beams 212', 214', which correspond to sidewalls 116L, 116R of cargo body 110 (see FIG. 1). In the exemplary embodiment shown, longitudinal main beams 150L, 150R are positioned laterally intermediate longitudinal axis A' and longitudinal ends 213'L, 213'R. Connectors 300L, 300R are positioned laterally intermediate a respective one of longitudinal main beams 150L, 150R and longitudinal ends 213'L, 213'R of beams 214'a-e. The individual longitudinal main beams 150L, 150R may be constructed in accordance with Sections 2 and 8 above. Specifically, each longitudinal main beam 150L, 150R may be a preform of a structural core wrapped in an outer skin. In other embodiments, because longitudinal main beams 150L, 150R are not used to support or anchor landing gear assembly 332, longitudinal main beams 150L, 150R may be shortened or eliminated at least in the area of landing gear assembly 332.

Landing gear assembly 332 includes T-shaped mounting brackets 334L, 334R, each having at least one vertical portion 336 and at least one horizontal portion 338. Vertical portion 336 may be integrally formed with horizontal portion 338 to form a single piece construction, or vertical portion 336 and horizontal portion 338 may be separate pieces that are coupled together (e.g., welded). In the exemplary embodiment shown, mounting brackets 334L, 334R are formed from extruded aluminum. The horizontal portion 338 of each of mounting brackets 334L, 334R may include one or more holes located on one or both sides of the corresponding vertical portion 336 to receive mechanical fasteners 339 on one or both sides of the corresponding vertical portion 336. Connectors 300L, 300R are aligned with corresponding mounting brackets 334L, 334R as shown in FIG. 14 such that mounting brackets 334L, 334R are mechanically coupled to connectors 300L, 300R using mechanical fasteners 339. The horizontal portion 338 may also be adhesively coupled to bottom surface 200' of floor assembly 112' using, for example, a structural adhesive. An advantage, among others, of mounting brackets 334L, 334R is that landing gear assembly 334 may be coupled to bottom surface 200' of floor assembly 112' without the need for longitudinal beams 152L, 152R (see FIG. 5).

To accommodate coupling landing gear assembly 332 to bottom surface 200' of floor assembly 112', one or more additional reinforcing layers may be added to the vertical wall portions of beams 214'a-e. The addition of one or more reinforcing layers increases the strength and/or stiffness of beams 214'a-e. This reinforcing layer may contain reinforcing fibers and may be capable of being impregnated and/or coated with a resin, as described in Sections 2 and 8 above. In the exemplary embodiment shown, the reinforcing fibers are present as chopped fiber fabrics. In addition, at least one reinforcing layer 340, illustratively reinforcing layers 340L, 340R, is positioned between connectors 300L, 300R embedded in beams 214'a-e and a respective one of mounting brackets 334L, 334R. In the exemplary embodiment shown, each reinforcing layer 340L, 340R comprises a glass fiber mat, as discussed in Section 2 above. An advantage, among others, of reinforcing layer 340 is increasing the pull-out or pull-through strength of embedded connectors 300L, 300R in beams 214'a-e. In another embodiment, a single reinforcing layer 340 may be used that spans both mounting brackets 334L, 334R. The size and type of reinforcing layer 340 may be dependent upon the load and application of cargo body 110.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A cargo body, comprising:
a composite floor assembly comprising a plurality of transverse beams;
a first plurality of connectors embedded in the plurality of transverse beams; and
a first longitudinal beam oriented generally orthogonal to the plurality of transverse beams, each of the first plurality of connectors positioned adjacent the longitudinal beam.

2. The cargo body of claim 1, wherein the first longitudinal beam is positioned laterally inward of a first end and a second end of each of the plurality of transverse beams and each of the first plurality of connectors is positioned laterally between the first longitudinal beam and the first end of the plurality of transverse beams.

3. The cargo body of claim 1, further comprising a second longitudinal beam oriented generally orthogonal to the plurality of transverse beams and laterally spaced apart from the first longitudinal beam.

4. The cargo body of claim 3, further comprising second plurality of connectors embedded in the plurality of transverse beams, the second plurality of connectors positioned adjacent the second longitudinal beam.

5. The cargo body of claim 4, wherein the first and second longitudinal beams are positioned laterally inward of the first and second plurality of connectors.

6. The cargo body of claim 1, wherein each of the plurality of transverse beams is formed from a core material and an outer skin, and wherein each of the plurality of connectors is embedded in the core material and surrounded by the outer skin of the corresponding beam.

7. The cargo body of claim 1, wherein a first connector and a second connector are embedded in each of the plurality of beams.

8. The cargo body of claim 1, wherein the plurality of connectors are spaced longitudinally and laterally apart from one another.

9. A cargo body, comprising:
a composite floor assembly comprising a plurality of transverse beams;
a first plurality of connectors embedded in the plurality of transverse beams; and
a first longitudinal beam oriented generally orthogonal to the plurality of transverse beams, each of the first plurality of connectors positioned adjacent the longitudinal beam;
wherein the first longitudinal beam includes a core material extending along a longitudinal length of the first longitudinal beam, the first plurality of connectors being laterally offset from the core material of the first longitudinal beam.

10. The cargo body of claim 9, wherein the first longitudinal beam further includes an outer skin surrounding at least a portion of the core material and the plurality of connectors are aligned with the outer skin.

11. A cargo body, comprising:
a composite floor assembly comprising a plurality of transverse beams;
a plurality of connectors embedded in the composite floor assembly; and
a landing gear assembly coupled to the plurality of connectors using a plurality of mechanical fasteners.

12. The cargo body of claim 11, wherein the composite floor assembly comprises a plurality of transverse beams and each of the plurality of connectors is embedded in a corresponding one of the plurality of transverse beams.

13. The cargo body of claim 11, further comprising:
a longitudinal beam coupled to the plurality of connectors, the plurality of connectors positioned laterally intermediate the longitudinal beam and an outer perimeter of the composite floor assembly.

14. The cargo body of claim 11, wherein:
the plurality of connectors includes a left connector embedded in a left side of the composite floor assembly and a right connector embedded in a right side of the composite floor assembly;
the landing gear assembly includes a left mounting bracket aligned with and fastened to the left connector and a right mounting bracket aligned with and fastened to the right connector.

15. The cargo body of claim 14, wherein:
the left mounting bracket is T-shaped with a vertical portion and a horizontal portion, the horizontal portion defining apertures aligned with the left connector on either side of the vertical portion; and
the right mounting bracket is T-shaped with a vertical portion and a horizontal portion, the horizontal portion defining apertures aligned with the right connector on either side of the vertical portion.

16. The cargo body of claim 14, further comprising:
a left reinforcing layer positioned between the left mounting bracket and the left connector; and
a right reinforcing layer positioned between the right mounting bracket and the right connector.

17. A cargo body, comprising:
a composite floor assembly;
a plurality of connectors embedded in the composite floor assembly;
a landing gear assembly coupled to the plurality of connectors using a plurality of mechanical fasteners; and
a longitudinal beam coupled to the plurality of connectors, the plurality of connectors positioned laterally intermediate the longitudinal beam and an outer perimeter of the composite floor assembly;
wherein in the landing gear assembly is further adhered to the longitudinal beam.

18. A cargo body, comprising:
a composite floor assembly including a plurality of beams;
a plurality of connectors embedded in the plurality of beams; and
a slide rail assembly coupled to the plurality of connectors using a plurality of mechanical fasteners.

19. The cargo body of claim 18, wherein the plurality of beams are oriented generally orthogonal to a longitudinal axis of the composite floor assembly.

20. The cargo body of claim 18, wherein a first connector and a second connector are embedded in each of the plurality of beams.

21. A method of manufacturing a composite floor assembly with at least one embedded connector, the method comprising:
positioning at least a first connector and a second connector in an outer skin, the second connector spaced apart from the first connector;
introducing an expandable core material into the outer skin;

expanding the core material around the at least first and second connectors in the outer skin to form a composite beam with the at least the first and second connectors embedded therein; and arranging the composite beam with a plurality of additional composite beams to form a composite floor assembly.

22. The method of claim 21, wherein the expandable core material is a foam.

23. The method of claim 21, wherein the arranging step comprises arranging the plurality of additional composite beams transversely across an inner portion of the composite floor assembly.

* * * * *